(12) United States Patent
Dong et al.

(10) Patent No.: US 12,228,304 B2
(45) Date of Patent: Feb. 18, 2025

(54) AIR VOLUME CONTROL VALVE CAPABLE OF ACCURATELY MEASURING AIR VOLUME

(71) Applicant: TONGZHOU LANHAI (BEIJING) HOLDING CO., LTD, Beijing (CN)

(72) Inventors: Lin Dong, Beijing (CN); Ning Sun, Beijing (CN); Xiangfang Li, Beijing (CN)

( * ) Notice: Subject to any disclaimer, the term of this patent is extended or adjusted under 35 U.S.C. 154(b) by 0 days.

(21) Appl. No.: 18/894,072

(22) Filed: Sep. 24, 2024

(65) Prior Publication Data

US 2025/0012475 A1     Jan. 9, 2025

Related U.S. Application Data

(63) Continuation of application No. PCT/CN2023/084095, filed on Mar. 27, 2023.

(30) Foreign Application Priority Data

Mar. 31, 2022   (CN) .......................... 202210346151.7

(51) Int. Cl.
*F24F 11/75*     (2018.01)
*F24F 11/89*     (2018.01)
(Continued)

(52) U.S. Cl.
CPC .............. *F24F 11/75* (2018.01); *F24F 11/89* (2018.01); *G01F 1/42* (2013.01); *F24F 2110/40* (2018.01)

(58) Field of Classification Search
CPC ....... F16K 37/0083; F24F 11/75; F24F 11/89; F24F 2110/40; G01F 1/42
See application file for complete search history.

(56) References Cited

U.S. PATENT DOCUMENTS 2,252,337 A  *  8/1941  Sidney ...................... G01F 1/42
                                                                138/44
2,448,071 A  *  8/1948  Anderson ................. G01F 1/42
                                                                138/44
(Continued)

FOREIGN PATENT DOCUMENTS

CN          2689185 Y      3/2005
CN          1837996 A      9/2006
(Continued)

OTHER PUBLICATIONS

Machine Translation of CN2876486Y retrieved from espacenet.com on Nov. 12, 2024 (Year: 2024).*

(Continued)

*Primary Examiner* — Jessica Cahill

(57) ABSTRACT

An air volume control valve capable of accurately measuring an air volume is provided. The air volume control valve includes a round-shaped valve body, and a valve blade and an orifice plate provided in the round-shaped valve body, where the orifice plate is located upstream of the valve blade; an upstream pressure tapping port and a downstream pressure tapping port are respectively provided upstream and downstream of the orifice plate; a distance from both the upstream pressure tapping port and the downstream pressure tapping port to the orifice plate is 0.5 times a valve diameter; the valve blade is located downstream of the downstream pressure tapping port; an inlet side of the round-shaped valve body is provided with a convergent duct fitting; and the convergent duct fitting is located at a distance of once the valve diameter upstream of the orifice plate and is tapered along an air flow direction.

10 Claims, 2 Drawing Sheets

(51) Int. Cl.
*F24F 110/40* (2018.01)
*G01F 1/42* (2006.01)

(56) References Cited

U.S. PATENT DOCUMENTS

| | | | | |
|---|---|---|---|---|
| 7,261,002 | B1* | 8/2007 | Gysling | G01F 1/7084 |
| | | | | 73/861.42 |
| 8,548,753 | B2* | 10/2013 | Rogers | G01F 1/74 |
| | | | | 73/861.64 |
| 11,441,930 | B2* | 9/2022 | Hollmach | G01F 1/42 |
| 11,841,720 | B2* | 12/2023 | Tokunaga | G05D 7/0647 |
| 2002/0162589 | A1 | 11/2002 | Lorch et al. | |
| 2003/0172742 | A1* | 9/2003 | Brookshire | G01F 1/36 |
| | | | | 73/861.21 |
| 2004/0144178 | A1* | 7/2004 | Ohmi | G05D 7/0635 |
| | | | | 73/708 |
| 2014/0182692 | A1 | 7/2014 | Hirata et al. | |
| 2020/0018413 | A1* | 1/2020 | Dohi | F16K 37/0041 |

FOREIGN PATENT DOCUMENTS

| | | |
|---|---|---|
| CN | 2876486 Y | 3/2007 |
| CN | 200940173 Y | 8/2007 |
| CN | 202349313 U | 7/2012 |
| CN | 204630622 U | 9/2015 |
| CN | 206017002 U | 3/2017 |
| CN | 208750947 U | 4/2019 |
| CN | 212986228 U | 4/2021 |
| CN | 113091838 A | 7/2021 |
| CN | 214502553 U | 10/2021 |
| CN | 114704947 A | 7/2022 |
| CN | 217482955 U | 9/2022 |
| DE | 102007037394 A1 * | 2/2009 ............ G01F 1/36 |
| EP | 3128212 A1 | 2/2017 |

OTHER PUBLICATIONS

GB/T 2624.2-2006/ISO 5167-2: 2003, Measurement of fluid flow by means of pressure differential devices inserted in circular-cross section conduits running full, General Administration of Quality Supervision, Inspection and Quarantine of the People's Republic of China, 2006, China National Standards, pp. 1-40.

ISO 5167-2, Measurement of fluid flow by means of pressure differential devices inserted in circular-cross section conduits running full—Part 2: Orifice plates, ISO, 2003, pp. 1-47.

* cited by examiner

AIR VOLUME CONTROL VALVE CAPABLE OF ACCURATELY MEASURING AIR VOLUME

CROSS-REFERENCE TO THE RELATED APPLICATIONS

This application is a continuation application of International Application No. PCT/CN2023/084095, filed on Mar. 27, 2023, which is based upon and claims priority to Chinese Patent Application No. 202210346151.7, filed on Mar. 31, 2022, the entire contents of which are incorporated herein by reference.

TECHNICAL FIELD

The present disclosure relates to the technical field of air conditioning and ventilation, and in particular to an air volume control valve capable of accurately measuring an air volume.

BACKGROUND

Some production and experimental facilities, such as pharmaceutical and biological production workshops, laboratory animal rooms, hospital operating rooms, as well as medical, biological, chemical engineering, and chemical laboratories, require accurate regulation of the supply or exhaust (return) air volume of the room's air conditioning and ventilation system, thereby maintaining the pressure differentials of the room (area). This can achieve air cleanliness and contaminant control, thereby ensuring product (sample) quality and personnel and environmental safety in accordance with relevant regulatory requirements.

Rooms and facilities can meet design requirements for air volume and pressure differentials when in static state. However, during operation, factors such as changes in the airtightness of the spaces, opening and closing of doors, and changes in the operating conditions of local exhaust equipment will cause changes in the room's air volume and deviations and fluctuations in the room's pressure differentials. This requires the air volume control valve of the air conditioning and ventilation system to maintain or regulate the air volume on the basis of accurate air volume measurement.

At present, there are two types of commonly used air volume control valves in projects. a) The first type is called an A-type control valve. The circular or rectangular valve body is provided therein with a single or multiple valve blades, and provided with an air volume sensor, an electric actuator, and a controller. The A-type control valve regulates the air volume by changing the angle of the blade. b) The second type is called a B-type control valve. The valve body is in the form of a Venturi tube and provided therein with a conical valve core and a mechanical mechanism connected to the valve core. The B-type control valve can maintain the air volume, and regulate the air volume through the external electric actuator.

In engineering applications, the above two types of control valves have the following problems.

(1) The air volume measurement and control accuracy of the A-type control valve is affected by duct fittings (such as an elbow and a tee) upstream of the valve. Usually, the control valve requires a straight duct section with a certain length (such as a length of 3-5 times the diameter of the valve) upstream to ensure the measurement and control accuracy. When it is hard to meet the length requirement of the straight duct section due to limited space on the construction sites, there will be significant deviations in air volume measurement and control. Tables 1 and 2 respectively show the air volume control performances of an A-type control valve with its diameter of 200 mm of a certain manufacturer immediately downstream of an elbow and a tee in the absence of a required straight duct section, where the actual air volumes are its averaged stable values. It can be observed that the maximum deviation exceeds the set point by 10%, and the minimum deviation exceeds the set point by 4%. Table 3 shows the performance of the same control valve in the presence of an upstream straight duct section with a length of 5 times the valve diameter. It can be seen that a sufficiently long straight duct section can greatly improve the control performance of the control valve.

TABLE 1

Actual air volume control performance of a 200 mm A-type air volume control valve downstream of an elbow 1 (without a straight duct section)

| Set air volume ($m^3/h$) | Actual air volume ($m^3/h$) | Average air velocity of air duct m/s | Deviation % |
| --- | --- | --- | --- |
| 350 | 330.3 | 2.9 | −5.6 |
| 650 | 621.7 | 5.5 | −4.4 |
| 900 | 852.1 | 7.5 | −5.3 |

Note 1:
The elbow is circular with a diameter of 200 mm, bent at 90°, with a bending radius of axis being 200 mm.

TABLE 2

Actual air volume control performance of a 200 mm A-type air volume control valve downstream of a tee branch (without a straight duct section)

| Set air volume ($m^3/h$) | Actual air volume ($m^3/h$) | Average air velocity of air duct m/s | Deviation % |
| --- | --- | --- | --- |
| 350 | 313.4 | 2.8 | −10.5 |
| 650 | 621.7 | 5.5 | −4.4 |
| 900 | 854.9 | 7.6 | −5.0 |

Note 1:
The tee is a circular Y-shaped tee, where the trunk diameter is 250 mm and the branch is 200 mm.

TABLE 3

Actual air volume control performance of a 200 mm A-type air volume control valve downstream of a tee (with a straight duct section with a length of 5 times the valve diameter)

| Set air volume ($m^3/h$) | Actual air volume ($m^3/h$) | Average air velocity of air duct m/s | Deviation % |
| --- | --- | --- | --- |
| 350 | 340.4 | 3.0 | −2.7 |
| 650 | 642.9 | 5.7 | −1.1 |
| 900 | 887.5 | 7.8 | −1.4 |

(2) The B-type control valve has no requirement for the upstream straight duct section, but its mechanical mechanism operates normally to maintain the air volume set point only when there is a certain static pressure differential across the control valve. Usually, even a small amount of air volume requires a starting pressure differential of around 100 Pa. A well-known brand product requires a minimum operating pressure differential of 150 Pa in the commonly used medium-pressure system. In order to adapt to pressure fluctuations in the system, the air volume control valve requires a larger normal operating pressure differential. A larger pressure differential requires higher energy consumption of the fan.

It can be seen that there are obvious inconveniences and defects in the designs and installations of both types of air volume control valves to be improved. A volume control valve that has no requirement for the upstream straight duct section but a low operating pressure differential has become a demand in the industry.

SUMMARY

In response to the shortcomings of the above mentioned air valves, the present disclosure is to provide an air volume control valve that can achieve accurate measurement and control of air volume with no requirement for the upstream straight duct section but a low operating pressure differential.

In order to solve the above technical problems, the present disclosure adopts the following technical solutions.

An air volume control valve capable of accurately measuring an air volume includes a round-shaped valve body, and a valve blade and an orifice plate provided in the round-shaped valve body, where the orifice plate is located upstream of the valve blade; an upstream pressure tapping port and a downstream pressure tapping port are respectively provided upstream and downstream of the orifice plate; a distance from both the upstream pressure tapping port and the downstream pressure tapping port to the orifice plate is 0.5 times the valve diameter; the valve blade is located downstream of the downstream pressure tapping port; an inlet side of the round-shaped valve body is provided with a convergent duct fitting; and the convergent duct fitting is located at a distance of once the valve diameter upstream of the orifice plate and is tapered along an air flow direction.

As a further improvement of the present disclosure, the air volume control valve further includes a pressure differential transducer, a microcontroller, and an actuator; the pressure differential transducer is connected to the upstream pressure tapping port and the downstream pressure tapping port through an upstream pressure tapping tube and a downstream pressure tapping tube, respectively; the pressure differential transducer is connected to the microcontroller; the microcontroller is connected to the actuator; and the actuator is configured to control an action of the valve blade.

Further, the orifice plate is provided with a circular inner hole; and the inner hole has a diameter that is 0.2-0.8 times the valve diameter.

Further, an angle of the convergent duct fitting is 5-30°.

Further, an outlet side of the round-shaped valve body is provided with a divergent duct fitting that gradually expands along the air flow direction Further, the round-shaped valve body is divided into an air volume measurement section and an air volume regulation section; the air volume measurement section is centered on the orifice plate and has a length that is twice the valve diameter; and the air volume regulation section is centered on a shaft of the valve blade.

Further, a protective shell is fitted outside the round-shaped valve body at the orifice plate, the upstream pressure tapping port, and the downstream pressure tapping port; and the pressure differential transducer, the microcontroller, the upstream pressure tapping tube, and the downstream pressure tapping tube are located inside the protective shell.

Further, the round-shaped valve body has a valve diameter of 150 mm, 200 mm, 250 mm, 300 mm, or 400 mm.

Further, there is a single or multiple valve blades.

With the above technical solutions, the present disclosure has at least the following advantages.

In the air volume control valve of the present disclosure, the orifice plate is located upstream of the valve blade, the convergent duct fitting is located at the inlet side of the round-shaped valve body, and the upstream and downstream pressure tapping ports are located at a distance of 0.5 times the valve diameter upstream and downstream of the orifice plate, respectively. In this way, the present disclosure can achieve air volume measurement in the absence of a straight duct section upstream, with the error not exceeding 3% within the designed air volume range. The present disclosure meets the requirements of general air conditioning and ventilation engineering for air volume measurement accuracy, creates conditions for air volume regulation and control. In addition, the present disclosure has a requirement for the low pressure differential across the air volume control valve.

BRIEF DESCRIPTION OF THE DRAWINGS

The above is only an overview of the technical solutions of the present disclosure. In order to understand the technical means of the present disclosure more clearly, the present disclosure will be further described in detail below with reference to the accompanying drawings and specific embodiments.

DETAILED DESCRIPTION OF THE EMBODIMENTS

Figure 1:
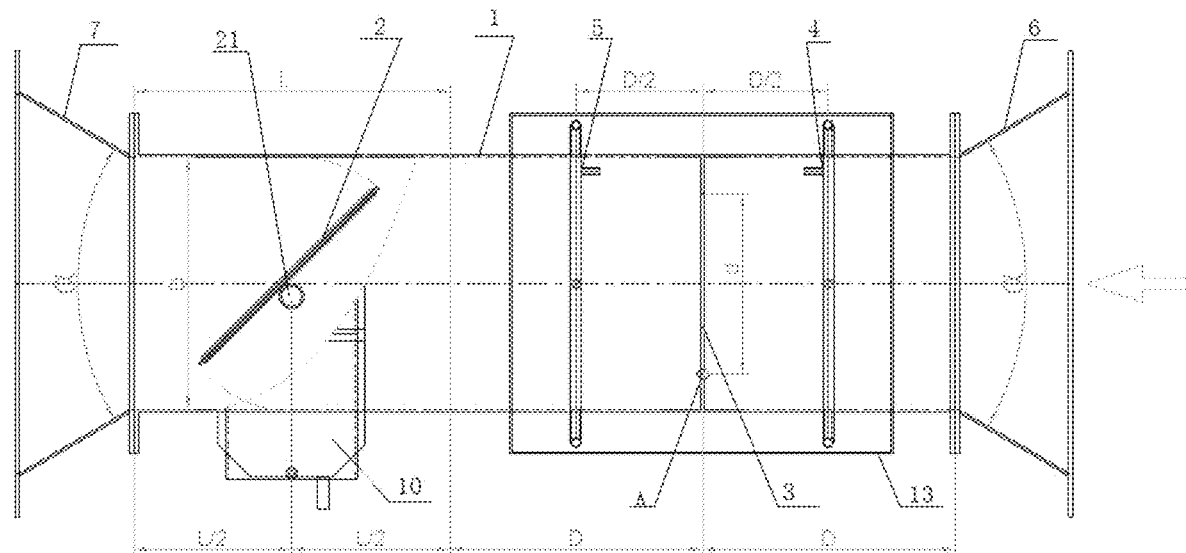
FIG. 1 is a section view of an air volume control valve capable of accurately measuring an air volume (the arrow indicates an air flow direction) according to an embodiment of the present disclosure.
Figure 2:
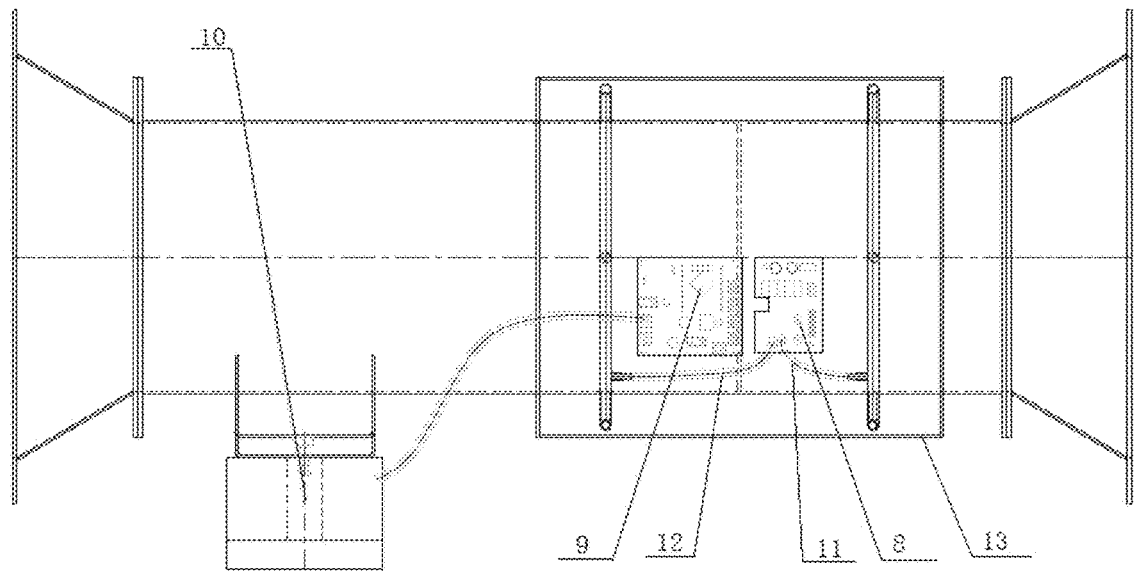
FIG. 2 is a perspective view of the air volume control valve according to an embodiment of the present disclosure.

Exemplary embodiments of the present disclosure will be described in detail below with reference to the drawings. Although the accompanying drawings show exemplary embodiments of the present disclosure, it should be understood that the present disclosure may be implemented in various forms and should not be limited to the embodiments set forth herein. The embodiments are provided to provide a more thorough understanding of the present disclosure, and the scope of the present disclosure can be fully conveyed to those skilled in the art.

The overall design concept of the present disclosure is to provide an orifice plate, which matches a convergent duct fitting upstream of the orifice plate, inside an air volume control valve, and to set the positions of upstream and downstream pressure tapping ports. In this way, during installation, there is no requirement for an upstream straight duct section and a low operating pressure differential, and accurate measurement and control of the air volume can be achieved.

Based on the theory of fluid mechanics, it is possible to establish the corresponding relationship between the pressure drop of any rigid resistance component such as an orifice plate or nozzle in a gas conduit and the gas flow rate, thereby achieving the measurement of air volume. However, in practical applications, certain conditions must be strictly met to achieve measurement accuracy and consistency. In the Chinese national standard GB/T2624.2-2006 (an equivalent of ISO5167-2:2003) Measurement of Fluid Flow by Means of Pressure Differential Devices Inserted in Circular Cross-section Conduits Running Full-Part 2: Orifice Plates, Table 3 shows the requirements for the required straight duct section between the orifice plate and the duct fitting without a stream straightener. For example, the minimum distance (length) from the elbow upstream of the orifice plate to the straight duct section of the orifice plate is 3 times the valve diameter (when the ratio of the inner diameter of the orifice plate to the diameter of the air duct is less than or equal to 0.20). When the diameter ratio is 0.75, the straight duct section must reach at least 20 times the valve diameter. This standard also puts forward a requirement for the positions of the pressure tapping ports before and after the orifice plate. That is, the distance from the pressure tapping port upstream of the orifice plate to the orifice plate is once the valve diameter, and the distance from the downstream pressure tapping port to the orifice plate is 0.5 times the valve diameter. Due to the extremely strict requirements, orifice flow meters are only used as aerodynamic testing devices in air conditioning and ventilation systems and cannot be used as a means of measuring air volume in building engineering systems.

The present disclosure makes an adjustment to the above-mentioned orifice plate and applies it to an air volume control valve, as shown in FIGS. 1 to 4.

An embodiment provides an air volume control valve capable of accurately measuring an air volume, including round-shaped valve body 1. The round-shaped valve body 1 can adopt different valve diameters D as needed, which can be 150 mm, 200 mm, 250 mm, 300 mm, or 400 mm. The round-shaped valve body 1 is provided therein with single or multiple valve blades 2. The valve blade 2 is rotatable along the shaft 21 to regulate the air volume.

Figure 3:
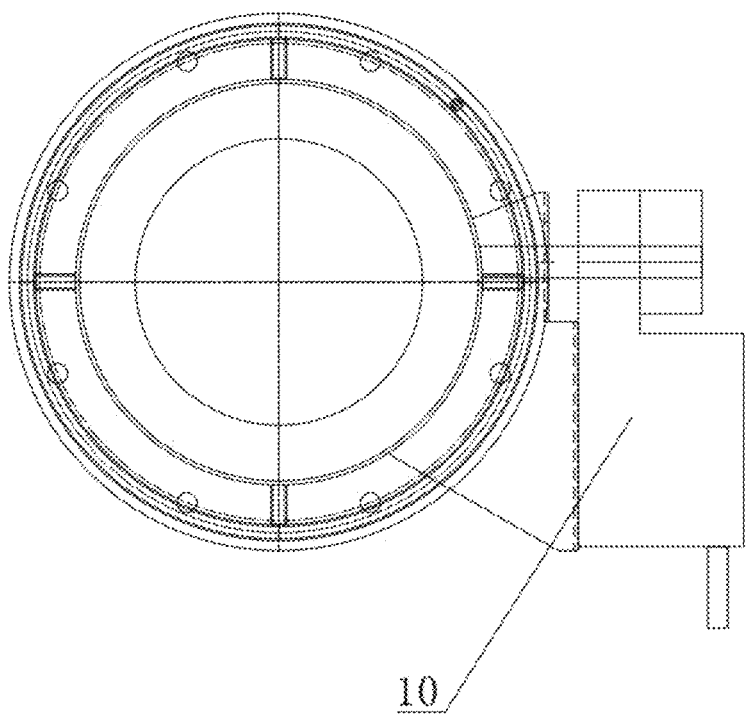
FIG. 3 is a front view of the air volume control valve according to an embodiment of the present disclosure.
Figure 4:
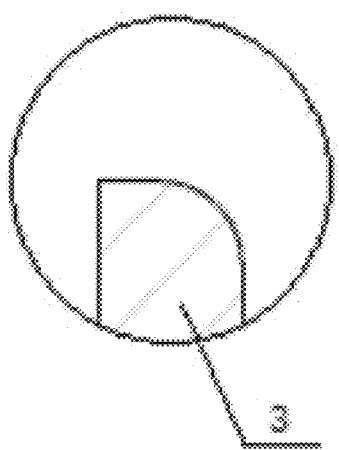
FIG. 4 is a detail of a part A shown in FIG. 1.

The round-shaped valve body 1 is further provided therein with orifice plate 3. The orifice plate 3 is located upstream of the valve blade 2. The orifice plate 3 is provided with a circular inner hole with diameter d being 0.2-0.8 times a valve diameter (d=0.2-0.8 D). As shown in FIG. 3, the opening of the orifice plate 3 can be rounded, angled, or without chamfering. Upstream pressure tapping port 4 and downstream pressure tapping port 5 are respectively provided upstream and downstream of the orifice plate 3. A distance from both the upstream pressure tapping port 4 and the downstream pressure tapping port 5 to the orifice plate 3 is 0.5 times the valve diameter. The valve blade 2 is located downstream of the downstream pressure tapping port 5.

An inlet side of the round-shaped valve body 1 is provided with convergent duct fitting 6. The convergent duct fitting 6 is located at a distance of once the valve diameter upstream of the orifice plate 3 and is tapered along an air flow direction. The angle α of the convergent duct fitting 6 is preferably 10-30°. The convergent duct fitting 6 can be changed from a rectangle to a circle or from a circle to a circle.

An outlet side of the round-shaped valve body 1 is provided with divergent duct fitting 7, which gradually expands along the air flow direction. Due to the same diameter of the air duct, the diameters at two ends of the air volume control valve are the same. The divergent duct fitting 7 is mainly designed to cooperate with the convergent duct fitting 6 to connect the downstream air duct.

The round-shaped valve body 1 of the air volume control valve can be divided into two sections: an air volume measurement section and an air volume regulation section. The air volume measurement section is centered on the orifice plate 3 and has a length that is twice the valve diameter (2D). The air volume regulation section is centered on the shaft 21 of the valve blade 2 and has a length of L.

The air volume control valve further includes pressure differential transducer 8, microcontroller 9, and actuator 10. The pressure differential transducer 8 is connected to the upstream pressure tapping port 4 and the downstream pressure tapping port 5 through upstream pressure tapping tube 11 and downstream pressure tapping tube 12, respectively. The pressure differential transducer 8 is connected to the microcontroller 9. The microcontroller 9 is connected to the actuator 10. The actuator 10 is configured to control an action of the valve blade 2.

Protective shell 13 is fitted outside the round-shaped valve body at the orifice plate 3, the upstream pressure tapping port 4, and the downstream pressure tapping port 5. The pressure differential transducer 8, the microcontroller 9, the upstream pressure tapping tube 11, and the downstream pressure tapping tube 12 are located inside the protective shell 13.

The air volume control valve of the present disclosure can achieve air volume measurement in the absence of a straight duct section upstream, with the error not exceeding 3% within the designed air volume range. The present disclosure meets the requirements of general air conditioning and ventilation engineering for air volume measurement accuracy, creates conditions for air volume regulation and control.

Tables 4 and 5 show the comparison between the air volume measurement values of the 200 mm (valve diameter of the round-shaped valve body) air volume control valve downstream of an elbow and a tee in the present disclosure and the measurement values of a sampling standard nozzle flowmeter. It can be seen that the deviation from the standard air volume is less than 3%. According to the experimental results, the measured data within the designed air volume range shows that the air volume measurement deviations of the other four devices of different specifications (diameters of 150 mm, 250 mm, 300 mm, and 400 mm) are also less than 3%.

TABLE 4

Comparison between the air volume measurement values of the 200 mm air volume control valve downstream of the elbow (without a straight duct section) in the present disclosure and the standard air volume

| Actual air volume (m³/h) | Average air velocity inside duct m/s | Air volume readings by valve (m³/h) | Deviation % |
| --- | --- | --- | --- |
| 1008.0 | 8.91 | 1024.5 | 1.63 |
| 1011.9 | 8.95 | 1025.8 | 1.38 |
| 1010.6 | 8.94 | 1026.5 | 1.58 |
| 1003.5 | 8.87 | 1019.2 | 1.56 |
| 991.3 | 8.76 | 1006.8 | 1.56 |
| 972.9 | 8.60 | 988.5 | 1.60 |
| 943.9 | 8.35 | 960.5 | 1.75 |
| 896.4 | 7.93 | 912.1 | 1.76 |
| 868.5 | 7.68 | 881.6 | 1.51 |
| 837.7 | 7.41 | 850.8 | 1.56 |
| 792.8 | 7.01 | 804.8 | 1.51 |
| 750.5 | 6.64 | 759.1 | 1.15 |
| 719.9 | 6.37 | 731.1 | 1.55 |
| 664.9 | 5.88 | 674.7 | 1.47 |
| 628.3 | 5.56 | 633.3 | 0.79 |
| 613.0 | 5.42 | 626.1 | 2.13 |
| 582.3 | 5.15 | 591.9 | 1.65 |
| 546.3 | 4.83 | 557.2 | 2.00 |
| 502.6 | 4.44 | 511.1 | 1.69 |
| 462.6 | 4.09 | 471.4 | 1.89 |
| 419.4 | 3.71 | 426.9 | 1.79 |
| 368.1 | 3.25 | 373.7 | 1.52 |
| 340.2 | 3.01 | 347.8 | 2.22 |

TABLE 4-continued

Comparison between the air volume measurement values of the 200 mm air volume control valve downstream of the elbow (without a straight duct section) in the present disclosure and the standard air volume

| Actual air volume (m³/h) | Average air velocity inside duct m/s | Air volume readings by valve (m³/h) | Deviation % |
|---|---|---|---|
| 307.8 | 2.72 | 312.8 | 1.60 |
| 266.0 | 2.35 | 270.4 | 1.66 |

TABLE 5

Comparison between the air volume measurement values of the 200 mm air volume control valve downstream of the tee branch (without a straight duct section) in the present disclosure and the standard air volume

| Actual air volume (m³/h) | Average air velocity inside duct m/s | Air volume readings by valve (m³/h) | Deviation % |
|---|---|---|---|
| 1010.6 | 8.94 | 1027.1 | 1.63 |
| 1013.0 | 8.96 | 1028.8 | 1.56 |
| 1008.6 | 8.92 | 1025.1 | 1.64 |
| 994.9 | 8.80 | 1013.1 | 1.83 |
| 983.6 | 8.70 | 999.5 | 1.62 |
| 962.5 | 8.51 | 981.1 | 1.93 |
| 925.6 | 8.18 | 942.6 | 1.84 |
| 901.1 | 7.97 | 916.9 | 1.75 |
| 873.4 | 7.72 | 886.5 | 1.51 |
| 834.2 | 7.38 | 847.6 | 1.61 |
| 805.5 | 7.12 | 819.7 | 1.77 |
| 740.9 | 6.55 | 751.5 | 1.43 |
| 708.0 | 6.26 | 715.6 | 1.07 |
| 675.6 | 5.97 | 678.6 | 0.44 |
| 636.1 | 5.62 | 641.1 | 0.78 |
| 588.5 | 5.20 | 596.7 | 1.41 |
| 528.0 | 4.67 | 533.0 | 0.95 |
| 497.0 | 4.39 | 503.3 | 1.26 |
| 465.1 | 4.11 | 467.4 | 0.51 |
| 431.6 | 3.82 | 433.6 | 0.46 |
| 399.4 | 3.53 | 397.8 | 0.38 |
| 352.2 | 3.11 | 347.0 | 1.46 |
| 317.1 | 2.80 | 312.9 | 1.33 |
| 285.4 | 2.52 | 280.8 | 1.62 |
| 281.8 | 2.49 | 284.8 | 1.06 |
| 235.2 | 2.08 | 236.2 | 0.45 |

In the present disclosure, according to the test of the performance of the 200 mm air volume control valve downstream of the elbow and the tee branch, the averaged stable values and deviations are shown in Tables 6 and 7, with deviations less than 3%.

TABLE 6

Actual air volume control performance of the 200 mm air volume control valve downstream of the elbow (without a straight duct section) in the present disclosure

| Air volume set point (m³/h) | Actual air volume (m³/h) | Average air velocity inside duct m/s | Deviation % |
|---|---|---|---|
| 350 | 353.3 | 3.1 | 0.9 |
| 650 | 643.1 | 5.7 | 1.1 |
| 900 | 890.6 | 7.9 | −1.0 |

TABLE 7

Actual air volume control performance of the 200 mm air volume control valve downstream of the tee (without a straight duct section) in the present disclosure

| Air volume set point (m³/h) | Actual air volume (m³/h) | Average air velocity inside duct m/s | Deviation % |
|---|---|---|---|
| 350 | 359.9 | 3.2 | 2.8 |
| 650 | 649.8 | 5.7 | −0.03 |
| 900 | 898.6 | 7.9 | −0.2 |

In addition, in the present disclosure, through testing, the recommended operating air volume range and corresponding pressure drops of the air volume control valves are shown in Table 8.

TABLE 8

Recommended air volume range and corresponding pressure drops of air volume control valves in the present disclosure

| Valve diameter mm | Recommended air volume range (m³/h) | Pressure drop range Pa |
|---|---|---|
| 150 | 150-450 | 14-117 |
| 200 | 350-800 | 24-120 |
| 250 | 500-1250 | 20-115 |
| 300 | 550-1800 | 11-110 |
| 400 | 900-3100 | 10-114 |

Tables 4 to 8 are the testing results of the air volume control valve based on the data in Table 9.

TABLE 9

Inner hole diameter of the orifice plate 3 and angle of the convergent duct fitting 6 for the air volume control valves in the present disclosure

| Valve diameter mm | Inner hole diameter of the orifice plate 3 mm | Angle of the convergent duct fitting 6 | |
|---|---|---|---|
| | | From round duct to round duct | From rectangular duct to round duct |
| 150 | 30-120 | 30° | 5°-30° |
| 200 | 40-160 | 30° | 5°-30° |
| 250 | 50-200 | 30° | 5°-30° |
| 300 | 60-240 | 30° | 5°-30° |
| 400 | 80-320 | 30° | 5°-30° |

After testing and verification, a similar effect can be achieved when the inner hole diameter d of the orifice plate 3 is 0.2-0.8 times the valve diameter (d=0.2-0.8 D) and the angle of the convergent duct fitting 6 is 5-30°.

Overall, in the air volume control valve of the present disclosure, the orifice plate is located upstream of the valve blade, the convergent duct fitting is located at the inlet side of the round-shaped valve body, and the upstream and downstream pressure tapping ports are located at a distance of 0.5 times the valve diameter upstream and downstream of the orifice plate, respectively. In this way, the present disclosure can achieve air volume measurement in the absence of a straight duct section upstream, with the error not exceeding 3% within the designed air volume range. The present disclosure meets the requirements of general air conditioning and ventilation engineering for air volume measurement accuracy, creates conditions for air volume regulation and control. In addition, the present disclosure has a requirement for a low pressure differential across the air volume control valve, suitable for application.

The above are only preferred embodiments of the present disclosure, and are not intended to limit the present disclosure in any form. Simple alterations, equivalent changes or modifications made by those skilled in the art make using the technical contents disclosed above fall within the scope of protection of the present disclosure.

What is claimed is:

1. An air volume control valve capable of accurately measuring an air volume, comprising a round-shaped valve body, and a valve blade and an orifice plate provided in the round-shaped valve body, wherein
   the orifice plate is located upstream of the valve blade; an upstream pressure tapping port and a downstream pressure tapping port are respectively provided upstream and downstream of the orifice plate; a distance from both the upstream pressure tapping port and the downstream pressure tapping port to the orifice plate is 0.5 times a valve diameter of the round-shaped valve body; and the valve blade is located downstream of the downstream pressure tapping port; and
   an inlet side of the round-shaped valve body is provided with a convergent duct fitting; and the convergent duct fitting is located at a distance of one times the valve diameter upstream of the orifice plate and is tapered along an air flow direction;
   wherein the orifice plate is provided with a circular inner hole; and the circular inner hole has a diameter that is 0.2-0.8 times the valve diameter;
   wherein the round-shaped valve body is divided into an air volume measurement section and an air volume regulation section; the air volume measurement section is centered on the orifice plate and has a length that is twice the valve diameter; and the air volume regulation section is centered on a shaft of the valve blade.

2. The air volume control valve capable of accurately measuring the air volume according to claim 1, further comprising a pressure differential transducer, a microcontroller, and an actuator, wherein
   the pressure differential transducer is connected to the upstream pressure tapping port and the downstream pressure tapping port through an upstream pressure tapping tube and a downstream pressure tapping tube, respectively; the pressure differential transducer is connected to the microcontroller; the microcontroller is connected to the actuator; and the actuator is configured to control an action of the valve blade.

3. The air volume control valve capable of accurately measuring the air volume according to claim 2, wherein a protective shell is fitted outside the round-shaped valve body at the orifice plate, the upstream pressure tapping port, and the downstream pressure tapping port; and the pressure differential transducer, the microcontroller, the upstream pressure tapping tube, and the downstream pressure tapping tube are located inside the protective shell.

4. The air volume control valve capable of accurately measuring the air volume according to claim 2, wherein an angle of the convergent duct fitting is 5-30°.

5. The air volume control valve capable of accurately measuring the air volume according to claim 2, wherein the round-shaped valve body has the valve diameter of 150 mm, 200 mm, 250 mm, 300 mm, or 400 mm.

6. The air volume control valve capable of accurately measuring the air volume according to claim 2, wherein there is a single or multiple valve blades.

7. The air volume control valve capable of accurately measuring the air volume according to claim 1, wherein an angle of the convergent duct fitting is 5-30°.

8. The air volume control valve capable of accurately measuring the air volume according to claim 7, wherein an outlet side of the round-shaped valve body is provided with a divergent duct fitting that gradually expands along the air flow direction.

9. The air volume control valve capable of accurately measuring the air volume according to claim 1, wherein the round-shaped valve body has the valve diameter of 150 mm, 200 mm, 250 mm, 300 mm, or 400 mm.

10. The air volume control valve capable of accurately measuring the air volume according to claim 1, wherein there is a single or multiple valve blades.

* * * * *